Figure 1:
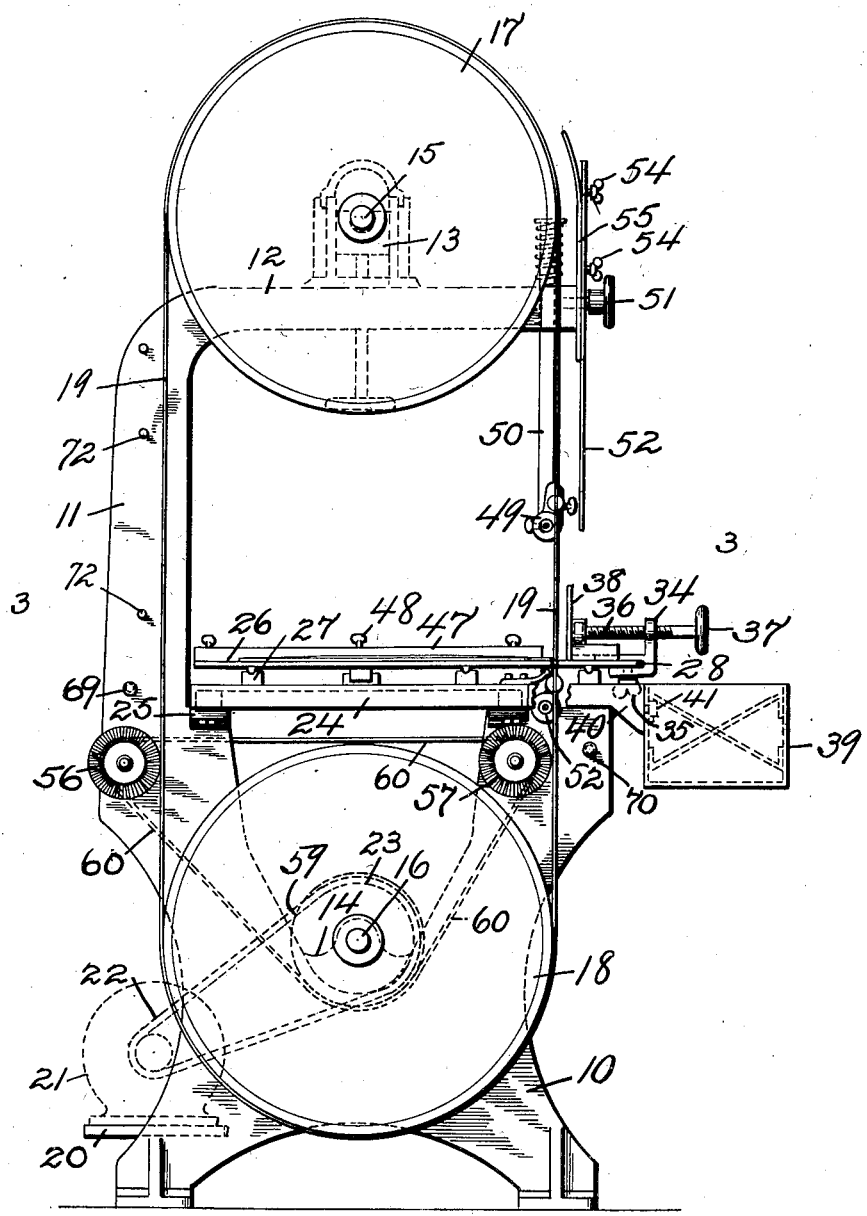

J. W. CLARK.
MEAT CUTTING MACHINE.
APPLICATION FILED JULY 13, 1920.

1,384,742.

Patented July 19, 1921.
2 SHEETS—SHEET 1.

INVENTOR
John W. Clark,
BY
Wm H Caufield,
ATTORNEY.

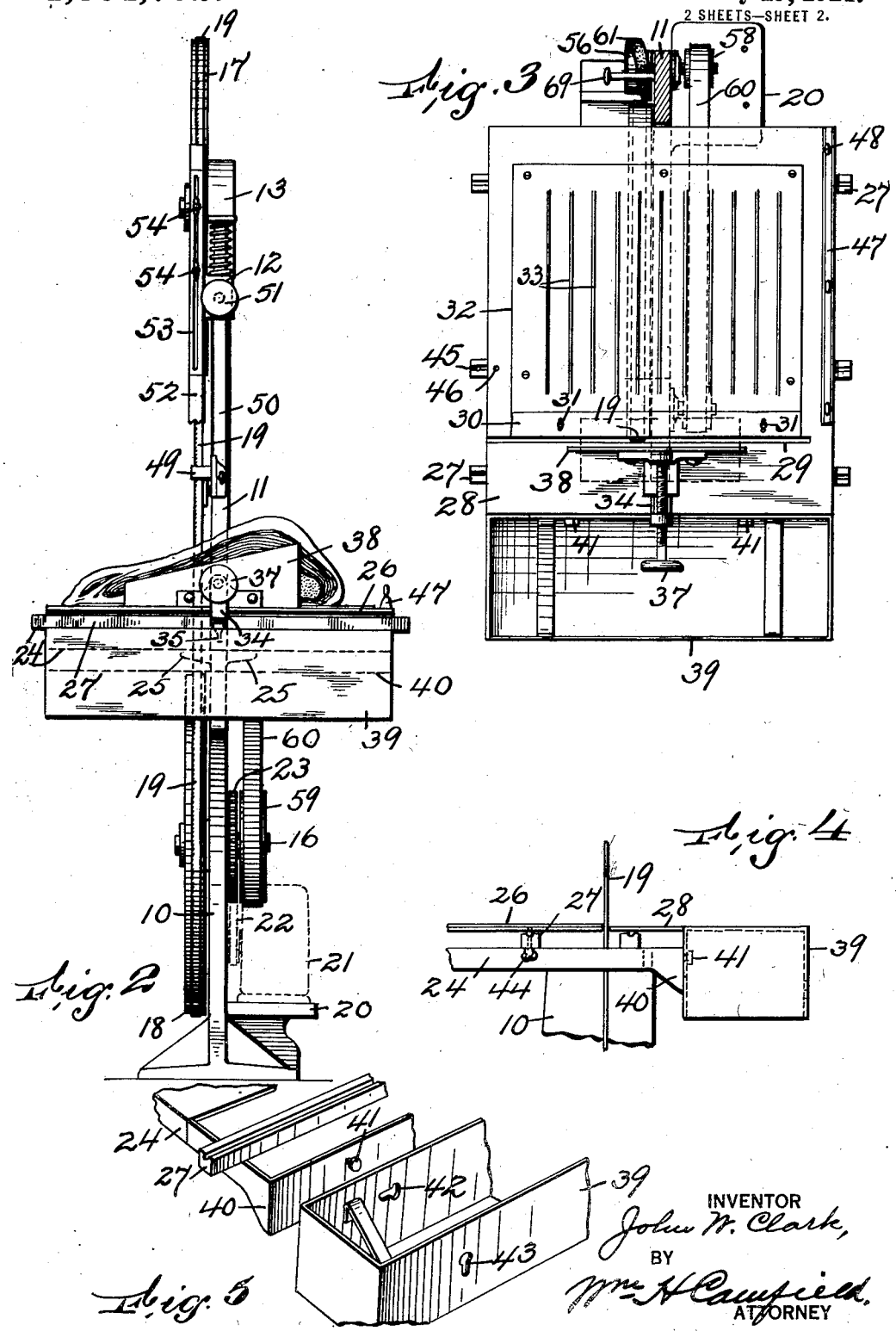

UNITED STATES PATENT OFFICE.

JOHN W. CLARK, OF ALHAMBRA, CALIFORNIA, ASSIGNOR OF ONE-HALF TO HENRY ALMOND, OF NEWARK, NEW JERSEY, AND ONE-HALF TO CLARK CUTTER, INC., OF NEWARK, NEW JERSEY, A CORPORATION OF NEW JERSEY.

MEAT-CUTTING MACHINE.

1,384,742. Specification of Letters Patent. Patented July 19, 1921.

Application filed July 13, 1920. Serial No. 395,947.

*To all whom it may concern:*

Be it known that I, JOHN W. CLARK, a citizen of the United States, and a resident of Alhambra, county of Los Angeles, and State of California, have invented certain new and useful Improvements in Meat-Cutting Machines, of which the following is a specification.

This invention relates to an improved meat cutting machine which is constructed so as to employ a band saw or knife passing over a pair of drums, between which drums is arranged a sliding table, so that as the table is propelled meat placed thereon is cut by the band saw.

The invention is further designed to provide a machine of this type which can be quickly adjusted to cut either small cuts, such as chops or the like, or can be used for cutting up large portions of meat. In both of said operations the saw steadying or guiding means, and also the meat supporting part of the structure, can be quickly adapted for proper functioning under such varying conditions.

The invention is illustrated in the accompanying drawings, in which Figure 1 is a front view of my improved meat cutting machine with the guards removed. Fig. 2 is an edge view of the machine shown in Fig. 1, and Fig. 3 is a section on line 3—3 in Fig. 1. Fig. 4 is a detail view of the end of the table and its bed, showing the receptacle reversed to form an extension of said table. Fig. 5 is a detail perspective view of the attaching means for the table and the bed shown in Fig. 4 to more clearly illustrate its construction.

The machine is mounted on a frame, which frame consists of a base portion 10, an upright 11 which is arranged on one side of the machine, and an upper horizontal arm 12. An adjustable bearing 13 is arranged in the upper arm and a suitable bearing 14 in the lower arm, which bearings receive the respective shafts 15 and 16, on which are mounted the drums 17 and 18, over which drums pass a band saw or knife 19, which band saw has straight portions or reaches between said drums, one at least of said portions being utilized for cutting purposes and which can be given the proper tension through the adjustable bearing 13.

Any suitable attachment for driving the machine can be devised, but for the purpose of making a compact structure to be used in butcher shops and the like, where a minimum of space is to be taken up, I provide a small platform 20 on which is mounted an electric motor 21 which drives, by means of a sprocket chain 22, a sprocket wheel 23 on the shaft 16, thus providing for the rotation of the drums and consequently the driving of the band saw.

Suitably supported at the top part of the base portion is a bed 24 which, in the form shown, is supported on the flanges 25 on the top part of said base portion, this bed being approximately square and having a marginal flange to give it the proper stiffness and appearance, and having mounted thereon the table 26, which is preferably spaced above said bed, the form shown comprising rails 27 on which the table 26 can slide, of course it being understood that suitable friction rollers or other devices can be used when necessary to make the sliding of the table easy. The major portion of the table is between the two straight portions of the band saw, but to one side thereof it projects, as at 28, the main portion and the projecting portion being separated for the major portion of their length by a slit 29 through which the saw passes.

It will be evident that meat placed on the table and bridging said slit 29 will be cut by the saw when the table and the material on it are slid past the saw. The table is usually made of steel or iron, but it is cut away at one edge of the slit 29 and a strip of softer metal, such as the strip 30, is inserted, which can be of aluminum or the like and is adjustable by means of the screws 31, so that in case of a slight twisting of the saw, should by any unforeseen circumstance such twisting be caused, the saw will not be damaged as the material of the strip 30 is softer than the material of the saw.

A top plate 32 can be used, if desired, which can be provided with corrugations 33 on which pieces of meat can rest, so that it is easier to propel the table by pressing on the meat instead of handling the table itself.

In order to control the thickness of the piece of meat cut, in case of thin slices, such as chops or the like being cut, I provide a gage which is preferably detachable from the projecting part 28 of the table 26, this gage having a bracket 34 detachably secured such as by means of the set-screw 35 and a screw 36 working in said bracket, and having a hand wheel 37 which can be turned to advance or retreat the plate 38, which is arranged substantially parallel with the slit 29.

A receptacle 39 is arranged on the end of the bed so that steaks or chops, when cut, can be deposited therein and, of course, the receptacle removed at stated intervals, when desired, this being the custom in large establishments where many such cuts are made at a time.

This is the disposition of the parts when small cuts are being made, but when the machine is to be changed so as to cut large pieces, such as halves of beef or quarters of beef, and it is desired that the weight of the portion of meat on each side of the saw be supported, the receptacle or trough 39 is turned upside down and utilized as an extension of the table 26. Such disposition is shown particularly in Fig. 4, since after the gage is removed, after unscrewing the set-screw 35, the receptacle 39 is turned upside down and is secured in position on the end 40 of the bed, one manner of accomplishing this being illustrated particularly in Fig. 5, the bed having studs 41 and the receptacle having key-hole slots 42 on one side which are disposed so that when the key-hole slots 42 are on the studs 41, the receptacle is in the position shown in Figs. 1 and 2, the receptacle also having key-hole slots 43 so disposed that when the receptacle is turned upside down and again put in position with the slots 43 over the studs 41, the receptacle is in the position shown in Fig. 4.

When the machine is used with this disposition of the parts for cutting larger pieces, there is approximately the same amount of table space on each side of the cutting portion of the band saw, and I prefer to fasten the table against sliding when such cutting is taking place, which securing is done by any suitable means, such as the set-screw 44 shown in Fig. 4, which fits into the holes 45 and 46 in one of the rails and in the table, respectively, which are shown slightly out of register in Fig. 3. The rear strip 47, which is detachably secured by the set-screw 48, is also removed when larger pieces are being cut by sliding them across the table, the table being fixed, instead of the smaller cuts which are cut by sliding the table with the meat.

An upper saw guide 49 is mounted above the table on a stem 50 adjustable in the end of the upper arm 12 and held in its different adjusted positions by a screw 51, a lower saw guide 52 being suitably secured to the bed of the machine. The upper saw guide 49 is adjustable according to the size of the cut that is being made, of course being raised when large pieces of meat are to be cut, and being brought down closer to the table when smaller pieces are being cut, so that there is no chance of twisting of the saw between the supports, such raising and lowering being usually accompanied by a raising or lowering of the guard 52 which has the slot 53 therein (see Fig. 2) and which is held in its adjusted positions by suitable means, such as the set-screws 54. The lower part of such guard is broken away in Fig. 2, but it normally extends down to a point slightly lower than the saw guide 49, which is usually placed rather close to the meat so that there is but little chance for the hand to come in contact with the saw as the guard 52 acts as a fender for the saw. The set-screws 54 screw into a plate 55 that is secured to the end of the arm 12 and substantially in line with the drum 17.

Suitably disposed, but preferably below the table, but above the lower drum, are the brushes 56 and 57 which rotate in bearings in the frame, and each has a pulley 58 mounted on the same shafts with the brushes and a larger pulley 59 is mounted on the shaft 16 and the belt 60 passes under the main pulley 59 and over the two pulleys 58 so that it passes through a substantially triangular path and the brushes are operated in unison. These brushes are preferably placed to the same side of their respective straight portions of the band saw, so that when they brush material from the saw they brush it downward, and in order to give a transverse or wiping motion to such cleaning, the bristles of the brushes are arranged as shown at 61 in Fig. 3, that is, they are arranged with a slight pitch in the frame, that is, in the form of a helix, so that a rotative motion is also combined with a wiping motion by the brush so that the material is swept from the face of the saw and also from out between the teeth.

It will be evident that slight changes can be made in the assembling or form of the parts without departing from the scope of my invention.

I claim:

1. A meat cutting machine comprising a frame including a bed, said frame supporting a band saw and its associated mechanism, a sliding table on the frame and between the reaches of the saw and projecting laterally beyond one of said reaches, an open topped receptacle adapted to be secured to the bed adjacent to and below the projecting end of the table, and coacting means on the frame and on the table so disposed that the receptacle when reversed has its bottom substantially level with the table to form an extension thereof.

2. A meat cutting machine comprising a frame including a bed, said frame supporting a band saw and its associated mechanism, a sliding table on the frame and between the reaches of the saw and projecting laterally beyond one of said reaches, an open topped receptacle, studs on the end of the frame, the receptacle having key-hole slots in one wall to support the receptacle below said table to receive cuttings therefrom, and having key-hole slots in one wall and so disposed that the receptacle can be supported bottom up with the bottom thereof substantially level with the table to form a stationary extension thereof.

3. A meat cutting machine comprising a frame, a pair of drums, a band saw passing over the drums, a bed on the frame between the drums, a sliding table above the bed, a receptacle on one end of the bed, coacting means on the bed and on the receptacle so that when the receptacle is turned bottom up and secured to the bed it is on the same level with the table and forms an extension thereof, and means for securing the table against sliding, whereby a fixed platform for the sawing of large bodies is provided.

In testimony that I claim the foregoing, I have hereto set my hand, this 12th day of July, 1920.

JOHN W. CLARK.